United States Patent
Bellenbaum et al.

(10) Patent No.: US 11,602,992 B2
(45) Date of Patent: Mar. 14, 2023

(54) METHOD FOR DISPLAYING POINTS OF INTEREST ON A DIGITAL MAP

(71) Applicant: Bayerische Motoren Werke Aktiengesellschaft, Munich (DE)

(72) Inventors: Jesper Bellenbaum, Munich (DE); Fabian Gruss, Froendenberg (DE); Florian Roider, Munich (DE); Sonja Ruemelin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 232 days.

(21) Appl. No.: 16/795,373

(22) Filed: Feb. 19, 2020

(65) Prior Publication Data

US 2020/0182647 A1 Jun. 11, 2020

Related U.S. Application Data

(63) Continuation of application No. PCT/EP2018/073831, filed on Sep. 5, 2018.

(30) Foreign Application Priority Data

Sep. 19, 2017 (DE) .................. 10 2017 216 527.8

(51) Int. Cl.
*G01C 21/36* (2006.01)
*G06F 3/01* (2006.01)
*B60K 35/00* (2006.01)

(52) U.S. Cl.
CPC .......... *B60K 35/00* (2013.01); *G01C 21/3614* (2013.01); *G01C 21/3673* (2013.01);
(Continued)

(58) Field of Classification Search
CPC ............... B60K 35/00; B60K 2370/11; B60K 2370/113; B60K 2370/115;
(Continued)

(56) References Cited

U.S. PATENT DOCUMENTS

2011/0047509 A1* 2/2011 Arrasvuori .............. G06F 16/29
706/54
2011/0060499 A1 3/2011 Suzuki
(Continued)

FOREIGN PATENT DOCUMENTS

DE 10 2006 037154 A1 10/2007
DE 10 2014 208 390 A1 11/2015
(Continued)

OTHER PUBLICATIONS

PCT/EP2018/073831, International Search Report dated Dec. 3, 2018 (Two (2) pages).
(Continued)

*Primary Examiner* — John T Repsher, III
(74) *Attorney, Agent, or Firm* — Crowell & Moring LLP

(57) ABSTRACT

A method for displaying points of interest on a digital map on a display, each point of interest being assigned at least one category and the space in front of the display being segmented into spatial regions where each spatial region is assigned a category. The method includes detecting the position of a hand of a user or part of the hand of the user by sensors, more particularly by cameras, identifying the spatial region in which the position of the hand or the part of the hand lies, identifying the category assigned to the identified spatial region, and displaying or highlighting the points of interest that have been assigned to the identified category.

10 Claims, 2 Drawing Sheets

(52) U.S. Cl.
CPC .......... *G06F 3/017* (2013.01); *B60K 2370/11* (2019.05); *B60K 2370/113* (2019.05); *B60K 2370/115* (2019.05); *B60K 2370/146* (2019.05); *B60K 2370/1464* (2019.05); *B60K 2370/152* (2019.05); *B60K 2370/157* (2019.05); *B60K 2370/158* (2019.05); *B60K 2370/164* (2019.05); *B60K 2370/166* (2019.05); *B60K 2370/191* (2019.05)

(58) Field of Classification Search
CPC ........ B60K 2370/157; B60K 2370/158; B60K 2370/191; B60K 2370/152; B60K 2370/164; B60K 2370/166; B60K 2370/146; B60K 2370/1464; B60K 2370/141; B60K 2370/21; B60K 2370/52; B60K 2370/151; B60K 37/06; G01C 21/3614; G01C 21/3673; G01C 21/3682; G01C 21/3685; G06F 3/017
See application file for complete search history.

(56) References Cited

U.S. PATENT DOCUMENTS

| | | | |
|---|---|---|---|
| 2013/0050131 A1* | 2/2013 | Lee | G08G 1/09626 345/174 |
| 2013/0194174 A1* | 8/2013 | Bondan | G06F 3/04842 345/156 |
| 2014/0267130 A1* | 9/2014 | Hwang | G06F 3/0488 345/174 |
| 2016/0061624 A1* | 3/2016 | Newlin | G01C 21/3611 701/426 |
| 2016/0170491 A1* | 6/2016 | Jung | G06F 3/0488 715/856 |
| 2017/0308268 A1* | 10/2017 | Chiba | G06F 3/04817 |
| 2019/0004667 A1* | 1/2019 | Barth | G06V 20/64 |

FOREIGN PATENT DOCUMENTS

| | | |
|---|---|---|
| DE | 10 2016 210 213 A1 | 12/2017 |
| DE | 10 2016 210 214 A1 | 12/2017 |
| DE | 10 2016 210 216 A1 | 12/2017 |
| DE | 10 2016 210 217 A1 | 12/2017 |
| EP | 2 937 765 A2 | 10/2015 |
| EP | 3 018 568 A1 | 5/2016 |

OTHER PUBLICATIONS

German Search Report issued in German counterpart application No. 10 2017 216 S27.8 dated Dec. 22, 2017, with Statement of Relevancy (Nine (9) pages).

* cited by examiner

Fig. 1
Fig. 2
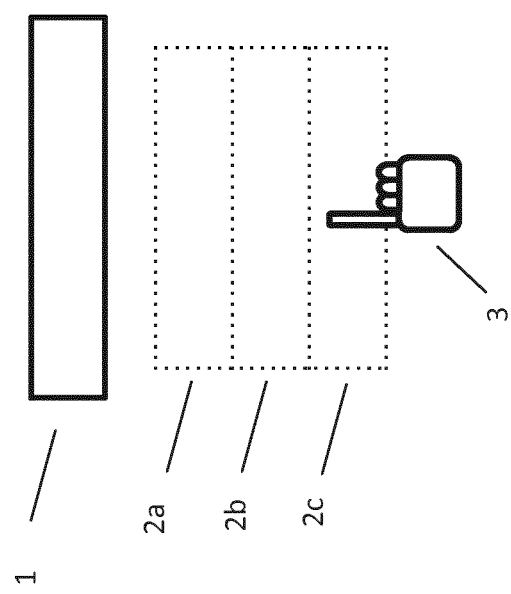

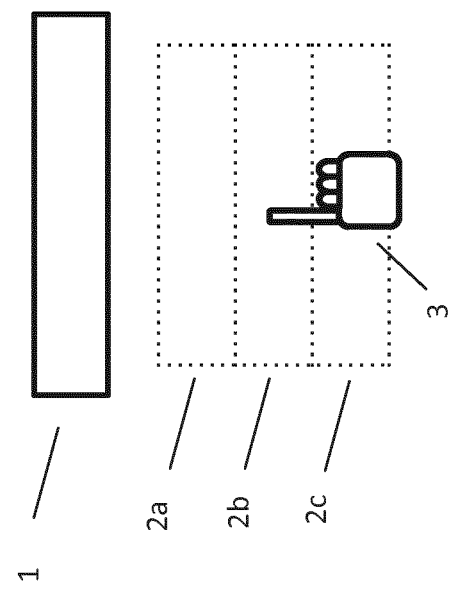
Fig. 3
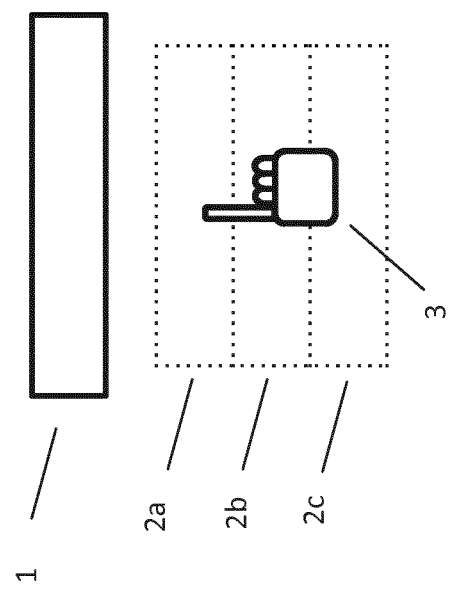
Fig. 4

METHOD FOR DISPLAYING POINTS OF INTEREST ON A DIGITAL MAP

CROSS REFERENCE TO RELATED APPLICATIONS

This application is a continuation of PCT International Application No. PCT/EP2018/073831, filed Sep. 5, 2018, which claims priority under 35 U.S.C. § 119 from German Patent Application No. 10 2017 216 527.8, filed Sep. 19, 2017, the entire disclosures of which are herein expressly incorporated by reference.

BACKGROUND AND SUMMARY OF THE INVENTION

The invention relates to a method for displaying points of interest on a digital map.

In addition to streets and places, nowadays it is known to also display what are known as points of interest (POIs) in digital maps through navigation systems in vehicles. For this purpose, the points of interest (POI) are stored in the map material of navigation systems. In this case, information about particular places that is either stored in the system or downloaded from the Internet is displayed. When used in vehicles, POIs are often displayed in the surroundings of the route. These places may be, for example, filling stations, parking areas, hotels, etc. In addition to the existence of such POIs in the route surroundings, modern navigation systems can also provide further information in addition thereto, for example the fuel price at a filling station or the number of free spaces in a parking area.

Using digital maps in vehicles shows that especially in urban areas there are many POIs that cannot all be presented clearly at the same time. The user must thus select which POIs they would like to have displayed, for example the user can prescribe categories of POIs, for instance that they would like only filling stations to be displayed. The user has to effect the setting by key, touch or speech input in a complex manner.

Modern on-board computers in vehicles are operated, inter alia, by gesture control. In this case, there are systems that detect the position of an outstretched finger in the three-dimensional space above the central console, in particular by means of (infrared) cameras and can interpret the gesture input of the user by comparison with predefined gestures.

A person skilled in the art is tasked with the object of improving the display of the points of interest and improving the selection of a clear presentation of the points of interest.

The object is achieved by the method and the apparatus according to the invention.

A first aspect of the invention relates to a method for displaying points of interest on a digital map on a display, wherein each point of interest is assigned at least one category, and wherein the space in front of the display is segmented into spatial regions, and wherein each spatial region is assigned a category; wherein the method comprises: detecting the position of the hand of a user by means of sensors, in particular cameras; identifying the spatial region in which the position of the hand lies; identifying the category assigned to the identified spatial region; displaying or highlighting only those points of interest that have been assigned to the identified category. The segmentation of the spatial regions is not physical segmentation but only differentiation of spatial regions during the execution of the method. A point of interest typically comprises a location and description of what is present there, which is typically the information about the category of what is present there. The spatial regions are typically separated by planes lying parallel to the plane of the display or perpendicular to the plane of the display. The category may relate to the type of point of interest (filling station, department store, railway station, etc.) or else also to the relevance or predefined meaning of the point of interest, or both. Provision is made, in particular, for the display of the points of interest to be adjusted or changed on the entire display and not just in one section of the display in the proximity of which the hand or a finger is located. Reference is made here to the hand of a user, but the method may also be applied to a part of the hand of the user such as a finger, a fingertip or the palm of the hand.

It is thus provided here that the category of the point of interest to be displayed is selected by means of the position of the hand of the user in front of the display. Only these points of interest and no points of interest of other categories are displayed. As an alternative, only these points of interest are highlighted with simultaneous further non-highlighted displaying of the other points of interest. As a result thereof, it is possible to present different points of interest intuitively and in an uncomplicated manner by gesture control and to reduce the searching effort for a particular point of interest by selecting a category. At the same time, the selection of the category to be displayed and the change between categories is reduced since this is possible through just a change in position of the hand.

It is therefore possible for the user to "scroll" back-and-forth between the different categories of points of interest. For this, the finger is followed as it passes through spatial regions along an axis by means of suitable sensors, in particular cameras. The direction of movement is preferably the axis perpendicular to the display of an on-board computer of the vehicle (Z axis to the display), whereby the finger approaches the display during "scrolling". The axis is divided into sections. These approaching sections in which the finger is located are assigned "information layers", that is to say the categories of the points of interest. The result is a "layer correspondence" between the spatial region (spatial layer) and the displayed points of interest, which can also be understood according to their categories as "layers".

In one development, the method furthermore comprises: detecting a fixation gesture; in response to the detection: permanently displaying or permanently highlighting those points of interest that were displayed at the time of the detection of the fixation gesture. The fixation gesture is a predefined gesture or movement of the hand, wherein a fixation gesture may also consist in simply holding the hand, that is to say not moving it for a determined period. This expansion of the method therefore makes it possible to "fix" a category of points of interest and to present it permanently on the display.

In response to the detection, additional points of interest of categories other than the category of the permanently displayed points of interest can be displayed or highlighted according to further positions of the hand; or no additional points of interest of other categories are displayed. After the selection of a category, the remaining points of interest of other categories can selectively be bypassed or likewise offered for selection (for example in order to be able to select from two categories; for example cafés and restaurants).

The fixation gesture can be carried out by: a minimum dwell time of the position of the hand in a spatial region; a change in the direction of movement of the hand. In one embodiment, the fixation gesture is a movement of the hand parallel to the planes that separate the spatial regions.

The following function thus results: that information layer is selected a) in which dwelling is the longest or lasts for a predefined time; and/or 2) in which a change in the direction of movement of the hand (for example approaching direction in the Z direction, selection by moving in the X direction relative to the display) or by a corresponding confirmation gesture has been executed. It is possible to detect different directions. Therefore, in addition to the movement in the Z direction, the movement from left to right on the screen can be perceived and other functions can be enabled or other layers can be scrolled through by way of the change in direction.

In one advantageous development, the method furthermore comprises outputting an auditory, haptic or visual signal when the identified category changes. In some developments, each category can be assigned a different predefined signal. The haptic signal may be a pulse on the hand, the fingertip or the midpoint of the hand. The pulse may be implemented by means of ultrasound (such as described, for example, in DE 10 2016 210 217 A1, DE 10 2016 210 216 A1, DE 10 2016 210 214 A1 or DE 10 2016 210 213 A1), or by way of other technologies such as air pulses or laser plasma (still in the research stage).

As a result thereof, the user receives visual and auditory feedback when passing through the individual planes, wherein each plane can be assigned an individual sound. As a result thereof, the present operating plane can be identified not only visually but also acoustically. Furthermore, this improves the interruptibility of the operating task and promotes better understanding of the plane boundaries from one another. If the hand leaves the interaction region, the operating process is terminated and planes that have already been selected are released again.

If an operation has been triggered, the information layers should no longer react to this when the hand is retracted in order to prevent a busy appearance.

Another aspect of the invention relates to a method for displaying points of interest on a digital map on a display, wherein each point of interest is assigned a location and a description; wherein the description is segmented into detail levels; and wherein the space in front of the display is segmented into spatial regions, and wherein each spatial region is assigned a detail level; wherein the method comprises: displaying the points of interest on the display; detecting the position of the hand of a user by means of sensors, in particular cameras; identifying the spatial region in which the position of the hand lies; identifying the detail level assigned to the identified spatial region; displaying the descriptions of the points of interest in the identified detail level. It is thus proposed here to change the degree of detail depending on the spatial region in which the user has their hand. This aspect can be combined with the aforementioned typical embodiments.

Another aspect of the invention relates to an apparatus, comprising a display, a computation unit and a sensor for detecting a hand or parts of the hand, wherein the apparatus is configured to execute a method according to one of the preceding claims. The apparatus can be formed by a navigation system, which is configured according to the invention, of a vehicle including gesture detection system.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 schematically shows an exemplary embodiment of the display of a typical digital map with points of interest; and FIGS. 2 to 4 schematically show exemplary embodiments of the method of the present invention during execution.

DETAILED DESCRIPTION OF THE DRAWINGS

Identical reference signs relate to the same elements across the Figures.

FIG. 1 schematically shows an exemplary embodiment of the display of a typical digital map 4 with points of interest. A digital map 4 is displayed on the display of a vehicle (of an on-board computer). The position of the vehicle in the map 4 is indicated by an arrow symbol. Points of interest (POIs), which are also displayed in the map, are located in the surroundings of the vehicle. The letter "T" denotes the category of filling stations, the letter "P" denotes parking areas and the reference "WC" denotes toilets.

During operation, the user moves their hand 3 with outstretched finger in the space in front of the display 1 as shown in FIG. 2. The space in front of the display 1 is subdivided into spatial regions 2a to 2c, which are separated by planes and which are parallel to the display 1. FIG. 2 shows in this respect a schematic view from above onto the display and the hand 3 located in front of it. The user has brought their finger into the spatial region 2c, which is detected by a camera (not shown in FIG. 2) arranged in the roof lining of the vehicle. The spatial region is assigned the category of parking areas in a table of the on-board computer. According to the assignment, the points of interest for parking areas are highlighted on the display. In FIG. 2, the highlighting is carried out by way of an additional circle 5 around the points of interest. The highlighting can also be carried out by graying out or fading out the points of interest that are not selected.

FIGS. 3 and 4 show the situation where the user brings their finger into the spatial region 2b and 2a and therefore highlights the assigned categories "filling stations" and "WC", respectively, which is again indicated by way of a circle around the point of interest.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A method for displaying points-of-interest on a digital map on a display, comprising:
assigning a first set of points-of-interest to a first category;
assigning the first category to a first spatial region in front of the display;
assigning a second set of points-of-interest to a second category, wherein the first set of points-of-interest and the second set of points-of-interest are different sets; and
assigning the second category to a second spatial region in front of the display, wherein the first spatial region is adjacent to the second spatial region and is separated from the display by the second spatial region and wherein the first category and the second category are different categories;

detecting, by a sensor, that a user's hand is within the first spatial region;

responsive to detecting that the user's hand is within the first spatial region, displaying and/or highlighting the first set of points-of-interest based on said assignment of the first set of points-of-interest to the first category; and responsive to detecting that the user's hand moves in a direction perpendicular to the display such that the user's hand transitions from being within the first spatial region to being within the second spatial region, displaying and/or highlighting the second set of points-of-interest based on said assignment of the second set of points-of-interest to the second category and no longer displaying and/or highlighting the first set of points-of-interest.

2. The method according to claim 1, wherein the sensor is a camera.

3. The method according to claim 1, wherein the first and second spatial regions are separated by a plane parallel to or perpendicular to the display.

4. The method according to claim 1, further comprising:
in response to detecting a fixation gesture of the user's hand while within the first spatial region, continuing to display and/or highlight the first set of points-of-interest despite subsequently detecting that the user's hand is not within the first spatial region.

5. The method according to claim 4, wherein, in response to detecting the fixation gesture of the user's hand while within the first spatial region, the first set of points-of-interest and the second set of points-of-interest are displayed and/or highlighted when the user's hand is detected as within the second spatial region.

6. The method according to claim 4, wherein the fixation gesture comprises:
a minimum dwell time of a position of the user's hand in the first spatial region; and/or
a change in a direction of movement of the user's hand.

7. The method according to claim 4,
wherein the first spatial region and the second spatial region are separated by a plane parallel to or perpendicular to the display, and
wherein the fixation gesture is a movement of the user's hand parallel to the plane parallel to or perpendicular to the display.

8. The method according to claim 1, further comprising:
outputting an auditory signal, a haptic signal or a visual signal when the user's hand is detected as transitioning between being within the first spatial region to being within the second spatial region.

9. An apparatus, comprising:
a display configured to display points-of-interest;
a sensor configured to detect a user's hand in front of the display;
a processor configured to control the display and the sensor so as to execute a method for displaying points-of-interest on a digital map on a display, comprising:
as signing a first set of points-of-interest to a first category;
assigning the first category to a first spatial region in front of the display;
assigning a second set of points-of-interest to a second category, wherein the first set of points-of-interest and the second set of points-of-interest are different sets; and
assigning the second category to a second spatial region in front of the display, wherein the first spatial region is adjacent to the second spatial region and is separated from the display by the second spatial region and wherein the first category and the second category are different categories;
detecting, by the sensor, that a user's hand is within the first spatial region;
responsive to detecting that the user's hand is within the first spatial region, displaying and/or highlighting the first set of points-of-interest based on said assignment of the first set of points-of-interest to the first category; and
responsive to detecting that the user's hand moves in a direction perpendicular to the display such that the user's hand transitions from being within the first spatial region to being within the second spatial region, displaying and/or highlighting the second set of points-of-interest based on said assignment of the second set of points-of-interest to the second category and no longer displaying and/or highlighting the first set of points-of-interest.

10. The method of claim 4, wherein, in response to detecting the fixation gesture of the user's hand while within the first spatial region, the first set of points-of-interest and not the second set of points-of-interest are displayed and/or highlighted despite the user's hand being detected as within the second spatial region.

* * * * *